United States Patent [19]

Russ et al.

[11] Patent Number: 5,316,992
[45] Date of Patent: May 31, 1994

[54] CATALYTIC REFORMING PROCESS WITH SULFUR ARREST

[75] Inventors: Michael B. Russ, Villa Park; Paul A. Sechrist, Des Plaines, both of Ill.

[73] Assignee: UOP, Des Plaines, Ill.

[21] Appl. No.: 976,158

[22] Filed: Nov. 13, 1992

Related U.S. Application Data

[63] Continuation-in-part of Ser. No. 635,003, Dec. 27, 1990, abandoned.

[51] Int. Cl.$^5$ .................... B01J 29/32; B01J 29/36
[52] U.S. Cl. ........................... 502/66; 502/74
[58] Field of Search ........................ 502/66, 74

[56] References Cited

U.S. PATENT DOCUMENTS

| | | | |
|---|---|---|---|
| 3,764,520 | 10/1973 | Kimberlin | 208/111 |
| 3,769,202 | 10/1973 | Plank et al. | 208/111 |
| 3,836,454 | 9/1974 | Hansford | 502/66 |
| 4,212,727 | 7/1980 | Antos | 208/111 |
| 4,225,417 | 9/1980 | Nelson | 208/89 |
| 4,257,918 | 3/1981 | Ginger | 252/440 |
| 4,329,220 | 5/1982 | Nelson | 208/89 |
| 4,341,660 | 7/1982 | Bertolacini et al. | 502/66 |
| 4,418,006 | 11/1983 | Kim et al. | 502/73 |
| 4,456,527 | 6/1984 | Buss et al. | 208/89 |
| 4,534,943 | 8/1985 | Novak et al. | 422/188 |
| 4,575,415 | 3/1986 | Novak et al. | 208/91 |
| 4,680,280 | 7/1987 | Pandey et al. | 502/66 |
| 4,741,819 | 5/1988 | Robinson et al. | 208/65 |
| 4,831,206 | 5/1989 | Zarchy | 585/737 |
| 4,954,245 | 9/1990 | Miller et al. | 208/138 |
| 5,059,304 | 10/1991 | Field | 208/99 |
| 5,066,628 | 11/1991 | Miller et al. | 502/66 |

Primary Examiner—Carl F. Dees
Attorney, Agent, or Firm—Thomas K. McBride; John F. Spears, Jr.; Richard E. Conser

[57] ABSTRACT

A catalyst system comprises a physical mixture of a conversion catalyst and a sulfur sorbent to accommodate small quantities of sulfur from a hydrocarbon feedstock. Preferably, the physical mixture comprises a sulfur-sensitive reforming catalyst protected from sulfur deactivation by a manganeseoxide catalyst. The invention shows substantial benefits over prior-art processes in catalyst utilization.

11 Claims, No Drawings

CATALYTIC REFORMING PROCESS WITH SULFUR ARREST

CROSS REFERENCE TO RELATED APPLICATION

This application is a continuation-in-part of prior copending application Ser. No. 635,003, filed Dec. 27, 1990 (now abandoned) the contents of which are incorporated herein by reference thereto.

BACKGROUND OF THE INVENTION

1. Field of the Invention

This invention relates to an improved catalyst system for the conversion of hydrocarbons, and more specifically for the catalytic reforming of gasoline-range hydrocarbons.

2. General Background

The catalytic reforming of hydrocarbon feedstocks in the gasoline range is an important commercial process, practiced in nearly every significant petroleum refinery in the world to produce aromatic intermediates for the petrochemical industry or gasoline components with high resistance to engine knock. Demand for aromatics is growing more rapidly than the supply of feedstocks for aromatics production. Moreover, the widespread removal of lead antiknock additive from gasoline and the rising demands of high-performance internal-combustion engines are increasing the required knock resistance of the gasoline component as measured by gasoline "octane" number. The catalytic reforming unit therefore must operate more efficiently at higher severity in order to meet these increasing aromatics and gasoline-octane needs. This trend creates a need for more effective reforming processes and catalysts.

Catalytic reforming generally is applied to a feedstock rich in paraffinic and naphthenic hydrocarbons and is effected through diverse reactions: dehydrogenation of naphthenes to aromatics, dehydrocyclization of paraffins, isomerization of paraffins and naphthenes, dealkylation of alkylaromatics, hydrocracking of paraffins to light hydrocarbons, and formation of coke which is deposited on the catalyst. Increased aromatics and gasoline-octane needs have turned attention to the paraffin-dehydrocyclization reaction, which is less favored thermodynamically and kinetically in conventional reforming than other aromatization reactions. Considerable leverage exists for increasing desired product yields from catalytic reforming by promoting the dehydrocyclization reaction over the competing hydrocracking reaction while minimizing the formation of coke.

The effectiveness of reforming catalysts comprising a non-acidic L-zeolite and a platinum-group metal for dehydrocyclization of paraffins is well known in the art. The use of these reforming catalysts to produce aromatics from paraffinic raffinates as well as naphthas has been disclosed. The increased sensitivity of these selective catalysts to sulfur in the feed also is known. It is believed that the extreme, unanticipated sulfur sensitivity of these reforming catalysts is primarily responsible for the lengthy development period and slow commercialization of this dehydrocyclization technology. Unit operations and processing costs would benefit from novel methods for sulfur management such as the process of the present invention.

Related Art

The desulfurization of naphtha feedstocks to a reforming process using sulfur sorbents is widely disclosed. U.S. Pat. Nos. 4,225,417 and 4,329,220 (Nelson) teach a reforming process in which sulfur is removed from a reforming feedstock using a manganese-containing composition. Preferably, the feed is hydrotreated and the sulfur content is reduced by the invention to below 0.1 ppm. U.S. Pat. Nos. 4,534,943 and 4,575,415 (Novak et al.) teach an apparatus and method, respectively, for removing residual sulfur from reformer feed using parallel absorbers for continuous operation; ideally, sulfur is removed to a level of below 0.1 ppm. U.S. Pat. No. B1 4,456,527 (Buss et al.) discloses the reforming of a hydrocarbon feed having a sulfur content of as low as 50 ppb (parts per billion) with a catalyst comprising a large-pore zeolite and Group VIII metal. A broad range of sulfur-removal options is disclosed to reduce the sulfur content of the hydrocarbon feed to below 500 ppb. U.S. Pat. No. 4,741,819 (Robinson et al.) is drawn to a method for removing residual sulfur from a hydrotreated naphtha feedstock comprising contacting the feedstock with a less-sulfur sensitive reforming catalyst, a sulfur sorbent, and a highly selective reforming catalyst. U.S. Pat. No. 4,831,206 (Zarchy) discloses a hydrocarbon conversion process comprising sulfur conversion, liquid-phase $H_2S$ removal with zeolite, and vaporization of the product to the reaction zone. A platinum/L-zeolite catalyst having improved sulfur tolerance through the incorporation of rhenium is revealed in U.S. Pat. No. 4,954,245 (Miller et al.) None of the above references anticipate or suggest a catalyst system comprising a physical mixture of a conversion catalyst and a sulfur sorbent, however.

Other applications of mixed-catalyst systems, in which there is synergy in having the features of each catalyst in proximity, are known. U.S. Pat. Nos. 3,764,520 (Kimberlin et al.) and 3,769,202 (Plank et al.) disclose hydrocarbon-conversion processes, specifically catalytic cracking, using catalyst mixtures of two zeolites of differing pore size. A process using a physical mixture of a reforming catalyst and a hydrocracking catalyst is disclosed in U.S. Pat. No. 4,212,727 (Antos). Removal of nitrogen oxides from gas streams using a physical mixture of a copper catalyst and a catalyst containing a combination of metals is taught in U.S. Pat. No. 4,257,918 (Ginger). U.S. Pat. No. 4,418,006 (Kim et al.) discloses a catalyst system comprising a physical particle-form mixture of a noble-metal catalyst free of zeolite and a zeolite free of metal. U.S. Pat. No. 5,059,304 (Field) teaches a combination of desulfurization with a platinum on alumina catalyst to avoid significant cracking and a sorbent comprising a supported Group I-A or II-A metal; the catalyst and sorbent may be intermixed. Nevertheless, none of these references discloses or suggests a mixture of a sulfur sorbent with a sulfur-sensitive conversion catalyst.

SUMMARY OF THE INVENTION

Objects

It is an object of the present invention to provide a catalyst system for a catalytic reforming process effective for the dehydrocyclization of paraffins with high catalyst stability. A corollary objective is to avoid sulfur deactivation of a reforming catalyst having unusual sulfur intolerance.

Summary

This invention is based on the discovery that a catalytic reforming process system utilizing a physical mixture of a sulfur-sensitive conversion catalyst and a sulfur sorbent is surprisingly effective in arresting sulfur in order to avoid deactivation of the sulfur-sensitive catalyst.

Embodiments

A broad embodiment of the present invention is a catalyst system comprising a physical mixture of a conversion catalyst containing a platinum-group metal and a sulfur sorbent containing a metal oxide.

A preferred embodiment of the catalyst system is a physical mixture of a platinum-containing conversion catalyst and a manganese oxide sulfur sorbent. An alternative embodiment of the conversion catalyst contains potassium-form L-zeolite. In an alternative embodiment, the conversion catalyst and the sulfur-sensitive reforming catalyst are the same catalyst.

Yet another alternative embodiment is a catalytic reforming process utilizing a catalyst system comprising a first conversion zone containing a physical mixture of a conversion catalyst and a sulfur sorbent and a second conversion zone containing a sulfur-sensitive reforming catalyst.

These as well as other objects and embodiments will become apparent from the detailed description of the invention.

DESCRIPTION OF THE PREFERRED EMBODIMENTS

To reiterate, a broad embodiment of the present invention is directed to a catalyst system comprising a physical mixture of a conversion catalyst containing a platinum-group metal and a sulfur sorbent containing a metal oxide. This catalyst system has been found to be surprisingly effective, in comparison to the prior art in which the conversion catalyst and sulfur sorbent are utilized in sequence, in arresting sulfur from contacting a sulfur-sensitive reforming catalyst. The mutual coaction of the catalyst and sorbent provides excellent results in achieving favorable yields with high catalyst utilization in a dehydrocyclization operation using a sulfur-sensitive catalyst.

First particles of conversion catalyst and second particles of sulfur sorbent are prepared as described hereinbelow. Preferably the first particles are essentially free of sulfur sorbent and the second particles are essentially free of conversion catalyst, and the first and second particles are mechanically mixed to provide the catalyst system of the invention. The particles can be thoroughly mixed using known techniques such as mulling to intimately blend the physical mixture. The mass ratio of conversion catalyst to sulfur sorbent depends primarily on the sulfur content of the feed, and may range from about 1:10 to 10:1. Preferably, a 100 cc sample of a contemporaneously mixed batch will not differ in the percentage of each component of the mixture relative to the batch by more than 10%.

Although the first and second particles may be of similar size and shape, the particles preferably are of different size and/or density for ease of separation for purposes of regeneration or rejuvenation following their use in hydrocarbon processing.

The conversion catalyst comprises a composite of a metallic hydrogenation-dehydrogenation component on a refractory support. This catalyst is effective to convert small amounts of sulfur in a hydrocarbon feedstock to a reforming process to $H_2S$, which then can readily be arrested by sorption from deactivating a sulfur-sensitive catalyst. The conversion catalyst will tolerate episodes of up to about 10 ppm of sulfur in the feedstock with substantial recovery of activity. The conversion catalyst also preferably effects some dehydrogenation of naphthenes in the feedstock and may contain acid sites which effect isomerization, cracking and dehydrocyclization.

The refractory support of the conversion catalyst should be a porous, adsorptive, high-surface-area material which is uniform in composition without composition gradients of the species inherent to its composition. Within the scope of the present invention are refractory supports containing one or more of: (1) refractory inorganic oxides such as alumina, silica, titania, magnesia, zirconia, chromia, thoria, boria or mixtures thereof; (2) synthetically prepared or naturally occurring clays and silicates, which may be acid-treated; (3) crystalline zeolitic aluminosilicates, either naturally occurring or synthetically prepared such as FAU, MEL, MFI, MOR, MTW (IUPAC Commission on Zeolite Nomenclature), in hydrogen form or in a form which has been exchanged with metal cations; (4) spinels such as $MgAl_2O_4$, $FeAl_2O_4$, $ZnAl_2O_4$, $CaAl_2O_4$; and (5) combinations of materials from one or more of these groups. The preferred refractory support for the conversion catalyst is alumina, with gamma- or eta-alumina being particularly preferred. Best results are obtained with "Ziegler alumina," described in U.S. Pat. No. 2,892,858 and presently available from the Vista Chemical Company under the trademark "Catapal" or from Condea Chemie GmbH under the trademark "Pural." Ziegler alumina is an extremely high-purity pseudoboehmite which, after calcination at a high temperature, has been shown to yield a high-priority gamma-alumina. It is especially preferred that the refractory inorganic oxide comprise substantially pure Ziegler alumina having an apparent bulk density of about 0.6 to 1 g/cc and a surface area of about 150 to 280 $m^2/g$ (especially 185 to 235 $m^2/g$) at a pore volume of 0.3 to 0.8 cc/g.

The alumina powder may be formed into any shape or form of carrier material known to those skilled in the art such as spheres, extrudates, rods, pills, pellets, tablets or granules. Spherical particles may be formed by converting the alumina powder into alumina sol by reaction with suitable peptizing acid and water and dropping a mixture of the resulting sol and gelling agent into an oil bath to form spherical particles of an alumina gel, as described in herein-incorporated U.S. Pat. No. 2,620,314, followed by known aging, drying and calcination steps. The preferred extrudate form is optimally prepared by mixing the alumina powder with water and suitable peptizing agents, such as nitric acid, acetic acid, aluminum nitrate and like materials, to form an extrudable dough having a loss on ignition (LOI) at 500° C. of about 45 to 65 mass %. The resulting dough is extruded through a suitably shaped and sized die to form extrudate particles, which are dried and calcined by known methods. Alternatively, spherical particles can be formed from the extrudates by rolling the extrudate particles on a spinning disk.

An essential component of the conversion catalyst is one or more platinum-group metals, with a platinum component being preferred. The platinum may exist within the catalyst as a compound such as the oxide, sulfide, halide, or oxyhalide, in chemical combination with one or more other ingredients of the catalytic composite, or as an elemental metal. Best results are obtained when substantially all of the platinum exists in the catalytic composite in a reduced state. The platinum component generally comprises from about 0.01 to 2 mass % of the catalytic composite, preferably 0.05 to 1 mass %, calculated on an elemental basis. It is within the scope of the present invention that the catalyst may contain metal modifiers known to modify the effect of the preferred platinum component. Such metal modifiers may include metals of Group IVA (14) of the Periodic Table [See Cotton and Wilkinson, *Advanced Organic Chemistry*, John Wiley & Sons (Fifth Edition, 1988)], other Group VIII (8-10) metals, rhenium, indium, gallium, zinc, uranium, dysprosium, thallium and mixtures thereof. Catalytically effective amounts of such metal modifiers may be incorporated into the catalyst by any means known in the art.

The conversion catalyst may contain a halogen component. The halogen component may be either fluorine, chlorine, bromine or iodine or mixtures thereof. Chlorine is the preferred halogen component. The halogen component is generally present in a combined state with the inorganic-oxide support. The halogen component is preferably well dispersed throughout the catalyst and may comprise from more than 0.2 to about 15 wt. %. calculated on an elemental basis, of the final catalyst.

An optional ingredient of the conversion catalyst is a nonacidic L-zeolite. The composition and preparation of an L-zeolite containing catalyst is described in more detail hereinbelow as the optional sulfur-sensitive reforming catalyst. It is within the ambit of the present invention that the catalyst used in the present physical mixture is the sulfur-sensitive reforming catalyst. In this embodiment, as described hereinbelow, the catalyst contains an alkali metal component and the preferred binder is a nonacidic amorphous silica.

The final conversion catalyst, as formed into first particles for preparation of the present physical mixture, generally will be dried at a temperature of from about 100° to 320° C. for about 0.5 to 24 hours, followed by oxidation at a temperature of about 300° to 550° C. in an air atmosphere for 0.5 to 10 hours. Preferably the oxidized catalyst is subjected to a substantially water-free reduction step at a temperature of about 300° to 550° C. for 0.5 to 10 hours or more. Further details of the preparation and activation of embodiments of the conversion catalyst are disclosed in U.S. Pat. No. 4,677,094 (Moser et al.), which is incorporated into this specification by reference thereto.

The sulfur sensitivity of the conversion catalyst and the sulfur-sensitive reforming catalyst, which may be the same catalyst as described herein, is measured as a Sulfur-Sensitivity Index or "SSI." The SSI is a measure of the effect of sulfur in a hydrocarbon feedstock to a catalytic reforming process on catalyst performance, especially on catalyst activity.

The SSI is measured as the relative deactivation rate with and without sulfur in the feedstock for the processing of a hydrocarbon feedstock to achieve a defined conversion at defined operating conditions. Deactivation rate is expressed as the rate of operating temperature increase per unit of time (or, giving equivalent results, per unit of catalyst life) to maintain a given conversion; deactivation rate usually is measured from the time of initial operation when the unit reaches a steady state until the "end-of-run," when deactivation accelerates or operating temperature reaches an excessive level as known in the art. Conversion may be determined on the basis of product octane number, yield of a certain product, or, as here, feedstock disappearance. In the present application, deactivation rate at a typical feedstock sulfur content of 0.4 ppm (400 ppb) is compared to deactivation rate with a sulfur-free feedstock:

$SSI = D_s/D_o$ $D_s$ = deactivation rate with 0.4 ppm sulfur in feedstock $D_o$ = deactivation rate with sulfur-free feedstock "Sulfur-free" in this case means less than 50 ppb, and more usually less than 20 ppb, sulfur in the feedstock.

As a ratio, SSI would not be expected to show large variances with changes in operating conditions. The base operating conditions defining SSI in the present application are a pressure of about 4.5 atmospheres, liquid hourly space velocity (LHSV) of about 2, hydrogen to hydrocarbon molar ratio of about 3, and conversion of hexanes and heavier hydrocarbons in a raffinate from aromatics extraction as defined in the examples. Other conditions are related in the examples. Operating temperature is varied to achieve the defined conversion, with deactivation rate being determined by the rate of temperature increase to maintain conversion as defined above. A sulfur-sensitive catalyst has an SSI of over 1.2, and preferably at least about 2.0. Catalysts with an SSI of about three or more are particularly advantageously protected from sulfur deactivation according to the present invention.

It is essential that the sulfur sorbent of the invention not only be effective for removal of small amounts of sulfur compounds from hydrocarbon streams at conversion-catalyst operating conditions, but also that the sorbent be compatible with the conversion catalyst in order to maintain the activity of the catalyst. The sulfur sorbent comprises a metal oxide, preferably selected from oxides of the metals having an atomic number between 19 and 30 inclusive; these metals, particularly potassium, calcium, vanadium, manganese, nickel, copper and zinc are known to be effective for sulfur removal in various circumstances. The sorbent optimally comprises a manganese component. Manganese oxide has been found to provide reforming catalyst protection superior to the zinc oxide of the prior art, it is believed, due to possible zinc contamination of associated reforming catalyst. The manganese oxides include $MnO$, $Mn_3O_4$, $Mn_2O_3$, $MnO_2$, $MnO_3$, and $Mn_2O_7$. The preferred manganese oxide is $MnO$ (manganous oxide). The manganese component may be composited with a suitable binder such as clays, graphite, or inorganic oxides including one or more of alumina, silica, zirconia, magnesia, chromia or boria in order to provide a second particle for the physical mixture of the present catalyst system. Preferably, the manganese component is unbound and consists essentially of manganese oxide. Even more preferably the manganese component consists essentially of MnO, which has demonstrated excellent results for sulfur removal and has shown adequate particle strength without a binder for the second particle of the present invention.

As an alternative embodiment of the present invention, the physical mixture of conversion catalyst and sulfur sorbent is contained within the same catalyst particle. In this embodiment, the catalyst and sorbent may be ground or milled together or separately to form particles of suitable size, preferably less than 100 microns, and the particles are supported in a suitable matrix. Preferably, the matrix is selected from the inorganic oxides described hereinabove.

The physical mixture of conversion catalyst and sulfur sorbent is contained either in a fixed-bed reactor or in a moving-bed reactor whereby catalyst may be continuously withdrawn and added. These alternatives are associated with catalyst-regeneration options known to those of ordinary skill in the art, such as: (1) a semiregenerative unit containing fixed-bed reactors maintains operating severity by increasing temperature, eventually shutting the unit down for catalyst regeneration and reactivation; (2) a swing-reactor unit, in which individual fixed-bed reactors are serially isolated by manifolding arrangements as the catalyst become deactivated and the catalyst in the isolated reactor is regenerated and reactivated while the other reactors remain on-stream; (3) continuous regeneration of catalyst withdrawn from a moving-bed reactor, with reactivation and substitution of the reactivated catalyst, permitting higher operating severity by maintaining high catalyst activity through regeneration cycles of a few days; or: (4) a hybrid system with semiregenerative and continuous-regeneration provisions in the same unit. The preferred embodiment of the present invention is fixed-bed reactors in a semiregenerative unit.

The present catalyst system may be utilized in a hydrocarbon-conversion process, and preferably in a process which also utilizes a catalyst which is highly sulfur-sensitive. The catalyst system may be contained in one reactor or in multiple reactors with provisions known in the art to adjust inlet temperatures to individual reactors. The feed may contact the catalyst system in each of the respective reactors in either upflow, downflow, or radial-flow mode. Since the preferred reforming process operates at relatively low pressure, the low pressure drop in a radial-flow reactor favors the radial-flow mode.

Operating conditions used in the process of the present invention include a pressure of from about atmospheric to 60 atmospheres (absolute), with the preferred range being from atmospheric to 20 atmospheres and a pressure of below 10 atmospheres being especially preferred. Free hydrogen preferably is supplied to the process in an amount sufficient to correspond to a ratio of from about 0.1 to 10 moles of hydrogen per mole of hydrocarbon feedstock. By "free hydrogen" is meant molecular $H_2$, not combined in hydrocarbons or other compounds. Preferably, the reaction is carried out in the absence of added halogen. The volume of the physical mixture of catalyst and sorbent corresponds to a liquid hourly space velocity of from about 0.5 to 40 $hr^{-1}$. The operating temperature generally is in the range of 260° to 560° C. This temperature is selected to convert sulfur compounds in the feedstock to $H_2S$ in order to arrest sulfur from contacting a subsequent sulfur-sensitive catalyst. Hydrocarbon types in the feedstock also influence temperature selection, as naphthenes generally are dehydrogenated over the first reforming catalyst with a concomitant decline in temperature across the catalyst bed due to the endothermic heat of reaction. The temperature generally is slowly increased during each period of operation to compensate for inevitable catalyst deactivation.

The hydrocarbon feedstock will comprise paraffins and naphthenes, and may comprise aromatics and small amounts of olefins, preferably boiling within the gasoline range. Feedstocks which may be utilized include straight-run naphthas, natural gasoline, synthetic naphthas, thermal gasoline, catalytically cracked gasoline, partially reformed naphthas or raffinates from extraction of aromatics. The distillation range may be that of a full-range naphtha, having an initial boiling point typically from 40°-80° C. and a final boiling point of from about 160°-210° C., or it may represent a narrower range within a lower final boiling point. Light paraffinic feedstocks, such as naphthas from Middle East crudes having a final boiling point of from about 100°-160° C., are preferred due to the specific ability of the process to dehydrocyclize paraffins to aromatics. Raffinates from aromatics extraction, containing principally low-value $C_6$–$C_8$ paraffins which can be converted to valuable B-T-X aromatics, are especially preferred feedstocks.

The hydrocarbon feedstock to the present process contains small amounts of sulfur compounds, amounting to generally less than 10 parts per million (ppm) on an elemental basis. Preferably the hydrocarbon feedstock has been prepared from a contaminated feedstock by a conventional pretreating step such as hydrotreating, hydrorefining or hydrodesulfurization to convert such contaminants as sulfurous, nitrogenous and oxygenated compounds to $H_2S$, $NH_3$ and $H_2O$, respectively, which then can be separated from the hydrocarbons by fractionation. This conversion preferably will employ a catalyst known to the art comprising an inorganic oxide support and metals selected from Groups VIB(6) and VIII(9–10) of the Periodic Table. Alternatively or in addition to the conventional hydrotreating, the pretreating step may comprise contact with sorbents capable of removing sulfurous and other contaminants. These sorbents may include but are not limited to zinc oxide, iron sponge, high-surface-area sodium, high-surface-area alumina, activated carbons and molecular sieves; excellent results are obtained with a nickel-on-alumina sorbent. Preferably, the pretreating step will provide the first reforming catalyst with a hydrocarbon feedstock having low sulfur levels disclosed in the prior art as desirable reforming feedstocks, e.g., 1 ppm to 0.1 ppm (100 ppb); sulfur levels of 0.5 to 0.15 ppm are usual in modern pretreating units.

Hydrocarbon product from the processing of the hydrocarbon feed in the present catalyst system generally will be essentially sulfur-free. Sulfur-free is defined as containing less than 20 parts per billion (ppb), and preferably less than 14 ppb, sulfur. In another aspect, sulfur-free is defined as containing no detectable sulfur. The repeatability of the American National Standard test ASTM D 4045-87 is 20 ppb at a sulfur level of 0.02 ppm (20 ppb), and "sulfur free" according to this test therefore would be defined as less than 20 ppb sulfur. It is believed, however, that one laboratory testing a series of similar samples can detect differences at lower sulfur levels, e.g., 10 $\mu$g/ml or 14 ppb sulfur.

The catalyst system may comprises a first conversion zone containing the physical mixture of the conversion catalyst and sulfur sorbent and a second conversion zone containing a sulfur-sensitive catalyst or, as disclosed hereinabove, the sulfur-sensitive catalyst may be used in the physical mixture. The first and second conversion zones may be contained in separate reactors or in the same reactor. It is within the scope of the invention that the catalyst system contains multiple successive reactors, two or more of which contain both a first and a second conversion zone. Multiple reactors, each containing the physical mixture as well as the sulfur-sensitive catalyst, would be effective where sulfur-contaminated equipment may release sulfur into the feed to the reactors or sulfur is injected into the feed to the reactor. For example, sulfur amounting to about 0.1 ppm relative to the feedstock may be injected to passivate equipment surfaces such as heater tubes.

The second conversion zone operates at a pressure, consistent with that of the first conversion zone described hereinabove, of from about atmospheric to 60 atmospheres (absolute) and preferably from atmospheric to 20 atmospheres. Excellent results have been obtained at operating pressures of less than 10 atmospheres. The free hydrogen to hydrocarbon mole ratio is from about 0.1 to 10 moles of hydrogen per mole of hydrocarbon from the first conversion zone. Preferably, the reaction is carried out in the absence of added halogen. Space velocity with respect to the volume of sulfur-sensitive reforming catalyst is from about 0.2 to 10 $hr^{-1}$. Operating temperature is from about 400° to 560° C., and may be controlled independently of temperature in the first conversion zone as indicated hereinabove. Reactants preferably contact the physical mixture and the sulfur-sensitive catalyst consecutively in a downflow manner and it is within the scope of the invention that a vapor, liquid, or mixed-phase stream is injected between the zones to control the inlet temperature of the reactants to the sulfur-sensitive catalyst.

Preferably the predominant reaction occurring in the second conversion zone is the dehydrocyclization of paraffins to aromatics, and this zone will comprise two or more reactors with interheating between reactors to compensate for the endothermic heat of reaction and maintain dehydrocyclization conditions. The second conversion zone thus will produce an aromatics-rich effluent stream, with the aromatics content of the $C_5+$ portion of the effluent typically within the range of about 45 to 85 mass %. The composition of the aromatics will depend principally on the feedstock composition and operating conditions, and generally will consist principally of $C_6-C_{12}$ aromatics. Benzene, toluene and $C_8$ aromatics will be the primary aromatics produced from the preferred light naphtha and raffinate feedstocks.

The sulfur-sensitive conversion catalyst preferably is a reforming catalyst containing a non-acidic large-pore molecular sieve. Suitable molecular sieves generally have a uniform pore opening or "pore size" of about 7 Å or larger and include those characterized as AFI, FAU or LTL structure type by the IUPAC Commission on Zeolite Nomenclature. The LTL structure is preferred, and the sulfur-sensitive catalyst optimally is a reforming catalyst comprising L-zeolite, an alkali-metal component and a platinum-group metal component. It is essential that the L-zeolite be non-acidic, as acidity in the zeolite lowers the selectivity to aromatics of the finished catalyst. In order to be "non-acidic," the zeolite has substantially all of its cationic exchange sites occupied by nonhydrogen species. Preferably the cations occupying the exchangeable cation sites will comprise one or more of the alkali metals, although other cationic species may be present. An especially preferred non-acidic L-zeolite is potassium-form L-zeolite.

It is necessary to composite the L-zeolite with a binder in order to provide a convenient form for use in the catalyst of the present invention. The art teaches that any refractory inorganic oxide binder is suitable. One or more of silica, alumina or magnesia are preferred binder materials of the present invention. Amorphous silica is especially preferred, and excellent results are obtained when using a synthetic white silica powder precipitated as ultra-fine spherical particles from a water solution. The silica binder preferably is non-acidic, contains less than 0.3 mass % sulfate salts, and has a BET surface area of from about 120 to 160 $m^2/g$.

The L-zeolite and binder may be composited to form the desired catalyst shape by any method known in the art. For example, potassium-form L-zeolite and amorphous silica may be commingled as a uniform powder blend prior to introduction of a peptizing agent. An aqueous solution comprising sodium hydroxide is added to form an extrudable dough. The dough preferably will have a moisture content of from 30 to 50 mass % in order to form extrudates having acceptable integrity to withstand direct calcination. The resulting dough is extruded through a suitably shaped and sized die to form extrudate particles, which are dried and calcined by known methods. Alternatively, spherical particles may be formed by methods described hereinabove for the conversion catalyst of the physical mixture.

An alkali metal component is an essential constituent of the sulfur-sensitive reforming catalyst. One or more of the alkali metals, including lithium, sodium, potassium, rubidium, cesium and mixtures thereof, may be used, with potassium being preferred. The alkali metal optimally will occupy essentially all of the cationic exchangeable sites of the non-acidic L-zeolite. Surface-deposited alkali metal also may be present as described in U.S. Pat. No. 4,619,906, incorporated herein by reference thereto.

The platinum-group metal component is another essential feature of the sulfur-sensitive reforming catalyst, with a platinum component being preferred. The platinum may exist within the catalyst as a compound such as the oxide, sulfide, halide, or oxyhalide, in chemical combination with one or more other ingredients of the catalytic composite, or as an elemental metal. Best results are obtained when substantially all of the platinum exists in the catalytic composite in a reduced state. The platinum component generally comprises from about 0.05 to 5 mass % of the catalytic composite, preferably 0.05 to 2 mass %, calculated on an elemental basis. It is within the scope of the present invention that the catalyst may contain other metal components known to modify the effect of the preferred platinum component. Such metal modifiers may include Group IVA(14) metals, other Group VIII(8-10) metals, rhenium, indium, gallium, zinc, uranium, dysprosium, thallium and mixtures thereof. Catalytically effective amounts of such metal modifiers may be incorporated into the catalyst by any means known in the art.

The final sulfur-sensitive reforming catalyst generally will be dried at a temperature of from about 100° to 320° C. for about 0.5 to 24 hours, followed by oxidation at a temperature of about 300° to 550° C. (preferably about 350° C.) in an air atmosphere for 0.5 to 10 hours. Preferably the oxidized catalyst is subjected to a substantially water-free reduction step at a temperature of about 300° to 550° C. (preferably about 350° C.) for 0.5 to 10 hours or more. The duration of the reduction step should be only as long as necessary to reduce the platinum, in order to avoid pre-deactivation of the catalyst, and may be performed in-situ as part of the plant startup if a dry atmosphere is maintained. Further details of the preparation and activation of embodiments of the sulfur-sensitive reforming catalyst are disclosed, e.g., in U.S. Pat. Nos. 4,619,906 (Lambert et al) and 4,822,762 (Ellig et al.), which are incorporated into this specification by reference thereto. As disclosed hereinabove, the sulfur-sensitive catalyst may be utilized in the physical mixture of conversion catalyst and sulfur sorbent.

Using techniques and equipment known in the art, the aromatics-containing effluent from the second conversion zone usually is passed through a cooling zone to a separation zone. In the separation zone, typically maintained at about 0° to 65° C., a hydrogen-rich gas is separated from a liquid phase. The resultant hydrogen-rich stream can then be recycled through suitable compressing means back to the first conversion zone. The liquid phase from the separation zone is normally withdrawn and processed in a fractionating system in order to adjust the concentration of light hydrocarbons and produce an aromatics-containing reformate product.

EXAMPLES

The following examples are presented to illustrate a certain specific embodiment of the present invention in comparison to the prior art. These examples should not be construed to limit the scope of the invention as set forth in the claims. There are many possible other variations, as those of ordinary skill in the art will recognize, which are within the spirit of the invention.

The examples demonstrate the effectiveness of a combination of a reforming catalyst and an MnO sulfur sorbent to remove sulfur from naphtha and illustrate the effect on the life of the conversion catalyst, when the conversion catalyst is the same as the sulfur-sensitive catalyst, of utilizing the present invention.

EXAMPLE I

The capability of a combination of a reforming catalyst and an MnO sulfur sorbent in series to achieve a substantially sulfur-free effluent from a naphtha feedstock was determined.

The platinum-tin on chlorided alumina reforming catalyst used in this determination contained 0.38 mass % platinum and 0.30 mass % tin. The manganous oxide consisted essentially of MnO in spherical pellets with over 90% in the size range of 4–10 mesh. Equal volumes of reforming catalyst and MnO were loaded in series with the reforming catalyst above the MnO. The sulfur-removal capability of this combination was tested by processing a hydrotreated naphtha spiked with thiophene to obtain a sulfur concentration of about 2 mass parts per million (ppm) in the feed. The naphtha feed had the following additional characteristics:

| Sp.gr. | | | 0.7447 |
|---|---|---|---|
| ASTM D-86, °C.: | IBP | | 80 |
| | 50% | | 134 |
| | EP | | 199 |

The naphtha was charged to the reactor in a downflow operation, thus contacting the reforming catalyst and MnO successively. Operating conditions were as follows:

| Pressure, atmospheres | 8 |
|---|---|
| Temperature, °C. | 371 |
| Hydrogen/hydrocarbon, mol | 3 |
| Liquid hourly space velocity, hr$^{-1}$ | 10* |

*On total loading of catalyst + MnO

Over the 13-day testing period, there was no detectable sulfur in the liquid or vapor products. Adjusting ASTM D4045 repeatability for laboratory experience, the product sulfur level was reported as less than 14 parts per billion (ppb). The combination of a platinum-tin-alumina catalyst ahead of a bed of manganous oxide thus was able to treat naphtha with a sulfur content higher than would be obtained by standard hydrotreating to yield a product containing no detectable sulfur.

EXAMPLE II

The advantage of the catalyst system of the invention in comparison to the prior art is illustrated via the comparative processing of 1000 metric tons per day of naphtha containing 0.5 mass ppm sulfur as thiophene.

Equal volumes of a conversion catalyst and a sulfur sorbent are loaded in reactors to achieve an overall liquid hourly space velocity of about 5 for both the illustration of the invention and the comparative case of the prior art. The catalyst and sorbent are physically mixed to illustrate the invention, and the conversion catalyst is loaded above the sulfur sorbent to illustrate the prior art. The relative quantities of catalysts and sorbent are as follows:

| Conversion catalyst | 4.8 tons |
|---|---|
| Sulfur sorbent | 9.6 tons |

The conversion catalyst is a sulfur-sensitive reforming catalyst as described hereinabove which suffers a rapid decline in dehydrocyclization capability in the presence of sulfur but retains capability for sulfur conversion up to its sulfur capacity, which is about 0.1 mass %. The conversion catalyst contains platinum on silica-bound potassium-form L-zeolite.

The sulfur sorbent is essentially pure manganous oxide, with a sulfur capacity of about 5 mass %.

The days of operation until full sulfur loading is achieved illustrates the advantage of the invention:

| Invention: | 970 days |
|---|---|
| Prior art | 9.6 days |

EXAMPLE III

The Sulfur-Sensitivity Index of a reforming catalyst of the prior art was determined. The extruded platinum-rhenium on chlorided alumina reforming catalyst used in this determination was designated Catalyst A and contained 0.25 mass % platinum and 0.40 mass % rhenium.

The SSI of this catalyst was tested by processing a hydrotreated naphtha in two comparative pilot-plant runs, one in which the naphtha was substantially sulfur-free and a second in which the naphtha was sulfur-spiked with thiophene to obtain a sulfur concentration of about 0.4 mass parts per million (ppm) in the feed. The naphtha feed had the following characteristics:

| Sp.gr. | | 0.746 |
|---|---|---|
| ASTM D-86, °C.: | IBP | 85 |
| | 50% | 134 |
| | EP | 193 |

The naphtha was charged to the reactor in a downflow operation, with operating conditions as follows:

| Pressure, atmospheres | 15 |
|---|---|
| Hydrogen/hydrocarbon, mol | 2 |

-continued

| | |
|---|---|
| Liquid hourly space velocity, hr$^{-1}$ | 2.5 |

Target octane number was 98.0 Research Clear. The tests were carried out to an end-of-run temperature of about 535° C.

The Sulfur-Sensitivity Index was calculated on the basis of the relative deactivation rates with and without 0.4 ppm sulfur in the feed. Within the precision of the test, the deactivation rates were the same with and without sulfur in the feed at 3.0° C./day, and the SSI for Catalyst A therefore was 1.0. Catalyst A therefore represents a control catalyst of the prior art with respect to Sulfur-Sensitivity Index.

EXAMPLE IV

The Sulfur-Sensitivity Index of a second non-zeolitic reforming catalyst was determined. The spherical platinum-rhenium on chlorided alumina reforming catalyst used in this determination was designated Catalyst B and contained 0.22 mass % platinum and 0.44 mass % rhenium.

The SSI of this catalyst was tested by processing hydrotreated naphtha in two sets of comparative pilot-plant runs, one each in which the naphtha was substantially sulfur-free (Runs B-1 and B-1') and one each in which the naphtha was sulfur-spiked with thiophene (Runs B-2 and B-2') to obtain a sulfur concentration of about 0.4 mass parts per million (ppm) in the feed. The naphtha feed differed in each of the sets of runs and had the following characteristics:

| | | B-1, B-2 | B-1', B-2' |
|---|---|---|---|
| Sp.gr. | | 0.746 | 0.744 |
| ASTM D-86, °C.: | IBP | 85 | 79 |
| | 50% | 134 | 130 |
| | EP | 193 | 204 |

The naphtha was charged to the reactor in a downflow operation, with operating conditions as follows:

| | B-1, B-2 | B-1', B-2' |
|---|---|---|
| Pressure, atmospheres | 15 | 18 |
| Hydrogen/hydrocarbon, mol | 2 | 2 |
| Liquid hourly space velocity, hr$^{-1}$ | 2.5 | 2.5 |

Target octane number was 98.0 Research Clear. The tests were carried out to an end-of-run temperature of about 535° C.

The Sulfur-Sensitivity Index was calculated on the basis of the relative deactivation rates with and without 0.4 ppm sulfur in the feed, with the following results:

| | |
|---|---|
| B-1 | 1.6° C./day |
| B-2 | 2.5° C./day |
| SSI = B-2/B-1 = | 1.6 |
| B-1' | 0.85° C./day |
| B-2' | 1.1° C./day |
| SSI = B-2'/B-1' = | 1.3 |

EXAMPLE V

The Sulfur-Sensitivity Index of a highly sulfur-sensitive reforming catalyst was determined. The silica-bound potassium-form L-zeolite reforming catalyst used in this determination was designated Catalyst C and contained 0.82 mass % platinum.

The SSI of this catalyst was tested by processing a hydrotreated naphtha in two comparative pilot-plant runs, one in which the naphtha was substantially sulfur-free (Run C-1) and a second in which the naphtha was sulfur-spiked with thiophene to obtain a sulfur concentration of about 0.4 mass parts per million (ppm) in the feed (Run C-2). The naphtha feed had the following additional characteristics:

| | | |
|---|---|---|
| Sp.gr. | | 0.6896 |
| ASTM D-86, °C.: | IBP | 70 |
| | 50% | 86 |
| | EP | 138 |

The naphtha was charged to the reactor in a downflow operation, with operating conditions as follows:

| | |
|---|---|
| Pressure, atmospheres | 4.5 |
| Hydrogen/hydrocarbon, mol | 3 |
| Liquid hourly space velocity, hr$^{-1}$ | 2 |

The tests were carried out to an end-of-run temperature of about 480° C.

The Sulfur-Sensitivity Index was calculated on the basis of the relative deactivation rates with and without 0.4 ppm sulfur in the feed, with the following results:

| | |
|---|---|
| C-1 | 0.3° C./day |
| C-2 | 4.0° C./day |
| SSI = C-2/C-1 = | 13 |

We claim:

1. A catalyst system comprising a physical mixture of a sulfur-sensitive conversion catalyst having a Sulfur-Sensitivity Index of at least about 2.0 and a sulfur sorbent, the conversion catalyst comprising a nonacidic large-pore molecular sieve, at least one platinum-group metal component and a refractory inorganic-oxide support and the sulfur sorbent comprising one or more manganese oxides.

2. The catalyst system of claim 1 comprising a physical mixture of (i) first particles comprising the conversion catalyst and essentially free of the sulfur sorbent and (ii) second particles comprising the sulfur sorbent and essentially free of the conversion catalyst.

3. The catalyst system of claim 1 wherein the nonacidic large-pore molecular sieve comprises nonacidic L-zeolite.

4. The catalyst system of claim 3 wherein the nonacidic L-zeolite comprises potassium-form L-zeolite.

5. The catalyst system of claim 1 wherein the platinum-group metal component of the conversion catalyst comprises a platinum component.

6. The catalyst system of claim 1 wherein the sulfur-sensitive catalyst further comprises an alkali metal component.

7. The catalyst system of claim 6 wherein the alkali-metal component comprises a potassium component.

8. The catalyst system of claim 1 wherein the sulfur-sensitive catalyst consists essentially of a nonacidic L-zeolite, an alkali metal component, a platinum-group metal component and an inorganic-oxide binder.

9. The catalyst system of claim 1 wherein the sulfur sorbent consists essentially of one or more manganese oxides.

10. The catalyst system of claim 9 wherein the sulfur sorbent consists essentially of MnO.

11. The catalyst system of claim 1 comprising a physical mixture of the conversion catalyst and sulfur sorbent on the same catalyst particle.

* * * * *